United States Patent [19]

Hebert, Sr.

[11] Patent Number: 4,976,655
[45] Date of Patent: Dec. 11, 1990

[54] CONNECTING ROD ASSEMBLY FOR DOWNHOLE DRILLING

[75] Inventor: Edwin D. Hebert, Sr., Broussard, La.

[73] Assignee: Mud Motors, Inc., Broussard, La.

[21] Appl. No.: 399,858

[22] Filed: Aug. 29, 1989

[51] Int. Cl.⁵ .............................................. F16D 3/18
[52] U.S. Cl. ...................... 464/16; 464/156; 464/158
[58] Field of Search .............. 464/16, 18, 19, 106, 464/147, 155, 156, 158, 159

[56] References Cited

U.S. PATENT DOCUMENTS

| | | | |
|---|---|---|---|
| 1,286,945 | 12/1918 | Coates | 464/156 |
| 1,860,762 | 5/1932 | Wyrick | 464/155 |
| 2,780,080 | 2/1957 | Cork | 464/106 |
| 2,845,781 | 8/1958 | O'Brien | 464/156 |
| 3,357,208 | 12/1967 | Chase | 464/16 |
| 4,472,160 | 9/1984 | Wright | 464/156 |

FOREIGN PATENT DOCUMENTS

| | | | |
|---|---|---|---|
| 678093 | 7/1939 | Fed. Rep. of Germany | 464/106 |
| 801721 | 1/1951 | Fed. Rep. of Germany | 464/155 |
| 55-82821 | 6/1980 | Japan | 464/155 |

*Primary Examiner*—Daniel P. Stodola
*Attorney, Agent, or Firm*—George A. Bode; Michael L. Hoelter

[57] ABSTRACT

A connecting rod assembly used in downhole drilling that has an articulated coupling secured to each end of a rigid connecting rod. This assembly connects via the articulated couplings, to axially misaligned shafts and transfers both rotational and axial forces between them. The rigidity of the connecting rod prevents it from flexing during this force transfer, thereby reducing transmission loss while increasing transmission capabilities. Each articulated coupling comprises lobed male and female members, spaced slightly apart from each other, that allow for the transfer of these forces between them. With such an arrangement, rotational and axially forces can be transferred to a drill or other bearing section from a rotating and gyrating downhole motor.

5 Claims, 8 Drawing Sheets

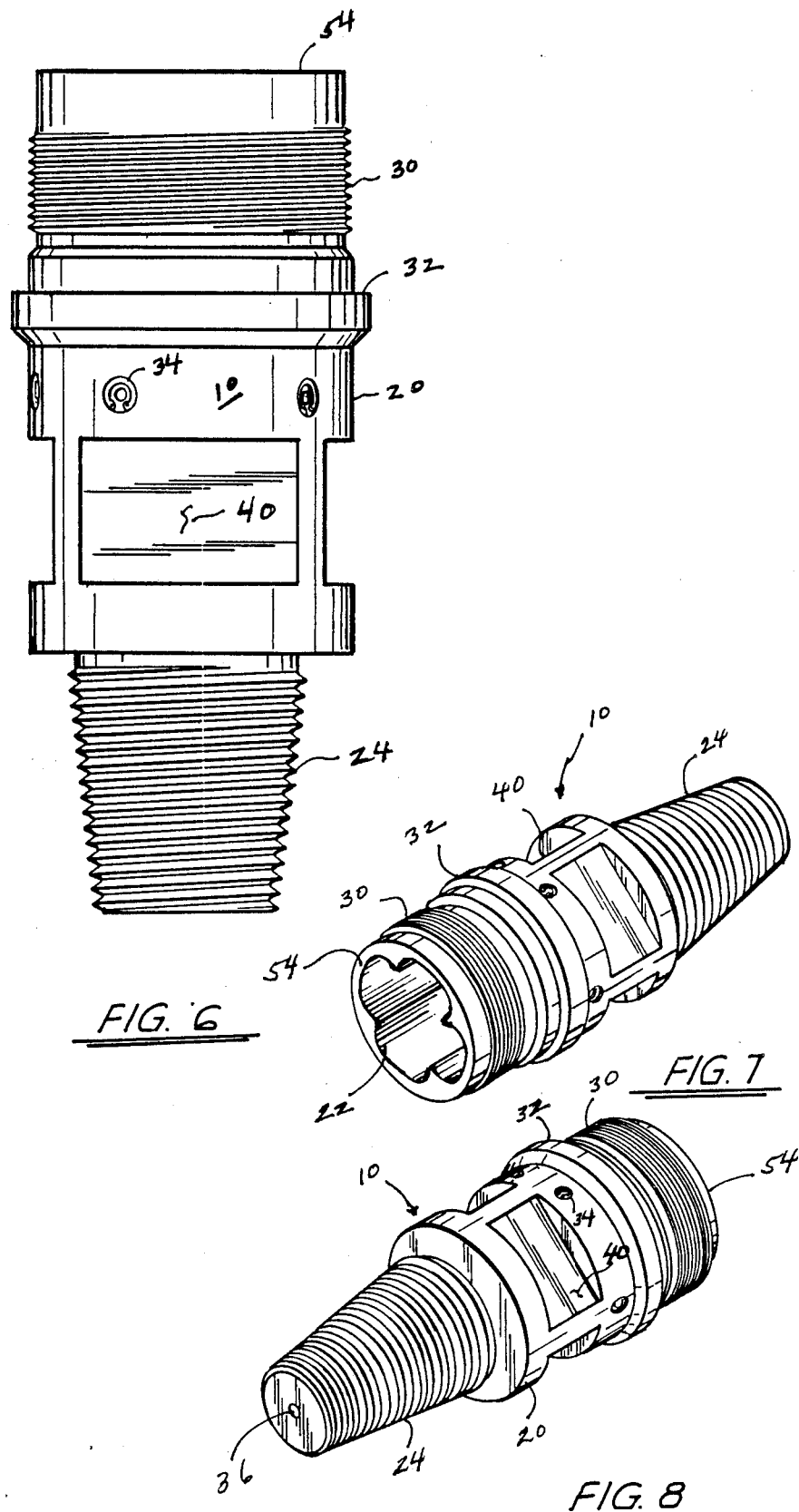

CONNECTING ROD ASSEMBLY FOR DOWNHOLE DRILLING

BACKGROUND OF THE INVENTION

1. Field of the Invention

This invention pertains to downhole drilling in general and more particularly to a rigid coupling having articulated connectors that transfer rotational force between two (2) axially misaligned shafts.

2. General Background

In downhole drilling, there are three (3) fundamental elements: a power generating motor section, a connecting rod section, and a bearing section. This invention pertains to the middle or connecting rod section.

There exists a variety of connecting rod sections that are currently in use. Their main purpose is to transfer, with as little loss as possible, the axial and rotational forces developed in the motor section to the bearing section. This is more complicated than it might at first appear because the transfer point of the motor section is usually a helical rod that not only rotates, but also gyrates with respect to the elongated axis of the well. The bearing section, on the other hand, cannot tolerate any gyration and must rotate exactly around a specific axis if damage to this bearing section is to be prevented.

In the past, U-joints were utilized to transfer the forces to the bearing section, but because of the tremendous pressures involved and the abrasive particles in the drilling mud, the pivoting or hinge pins soon wore out. Also, it was discovered that even though these hinge pins might be sealed, the U-joints were not able to withstand the torsion and axial loads applied.

An improvement over the U-joint was a "flexible rod" connection. Essentially, the connector was a small diameter elongated rod that connected between the gyrating motor section and the "fixed" bearing section. The gyration of the motor section was absorbed by the bending or flexing of the connector so that only a rotational force was delivered to the bearing section. A drawback to this "flexible rod", however, is the fact that continued flexing of the rod soon resulted in metal fatigue. Also, the rod was subject to friction and wear as it was moved around the interior of the well casing. Finally, the amount of axial thrust that could be applied to the bearing section was limited because the flexible rod "gave."

It is thus an object of this invention to provide a connecting rod section that can transmit the rotational force from a gyrating motor section to a nongyrating bearing section. Another object of this invention is to provide a connecting rod that is rigid or stiff and thus does not have the negative attributes of a "flexible rod" connection. A further object of this invention is to provide a means of accommodating a gyrating motor shaft without the drawback of a U-joint. Yet another object of this invention is to provide a connecting rod that is shorter than those currently used, thereby reducing the magnification of the bending moment forces on the connecting rod due to the off-set or misaligned gyration of the motor section. Yet another object of this invention is to provide a connecting rod that has an increased cross-sectional area in order to increase both its working life and its working strength. Still another object of this invention is to provide a connecting rod that is of monolithic construction so that it is easier to inspect for cracks or imperfections than is possible for other types of connecting rods which incorporate an outer covering or wear surface. Still another object of this invention is to provide a connecting rod that is quick and easy to assemble or disassemble, as the case may be, and attach or disattach to the motor section. Furthermore, an object of this invention is to provide a connecting rod that incorporates a superior method of providing and preserving the integrity of the packing which holds in the lubricant so as to enhance the life of the connecting rod. Another object of this invention is to provide a connecting rod that is relatively easy and inexpensive to construct, and one that does not require exotic materials or unique manufacturing methods. Yet another object of this invention is to provide a connecting rod that transfers mechanical motion smoother as compared to other connecting rods thus reducing vibration and enhancing the overall life of the tool. These and other objects will become obvious upon further investigation.

SUMMARY OF THE PRESENT INVENTION

The preferred embodiment of the apparatus of the present invention solves the aforementioned problems in a straight forward and simple manner. This invention pertains to a connecting rod assembly connecting between two (2) axially misaligned members for transferring a rotational force between them. It incorporates an elongated rigid generally cylindrical connecting rod having an articulated coupling secured to each end. Each articulated coupling comprises a male component and a female component. The female component has a lobed opening therein configured to loosely accept the lobed male member while enabling the transfer of axial thrust and circular rotation between them. The male component is configured having means for creating an annular gap between the male and female components whenever the one is inserted within the other. This annular gap enables these components to articulate when thusly joined. Lubrication, sealing, and protection means are provided to lubricate, seal, and protect, respectively, this articulated coupling.

BRIEF DESCRIPTION OF THE DRAWINGS

For a further understanding of the nature and objects of the present invention, reference should be had to the following description taken in conjunction with the accompanying drawings in which like parts are given like reference numerals and, wherein:

FIG. 6 is a rear elevational view of the component of FIG. 1;

FIG. 7 is a top perspective view of the component of FIG. 1;

FIG. 8 is a bottom perspective view of the component of FIG. 1;

DETAILED DESCRIPTION OF THE PREFERRED EMBODIMENT

Figure 2:
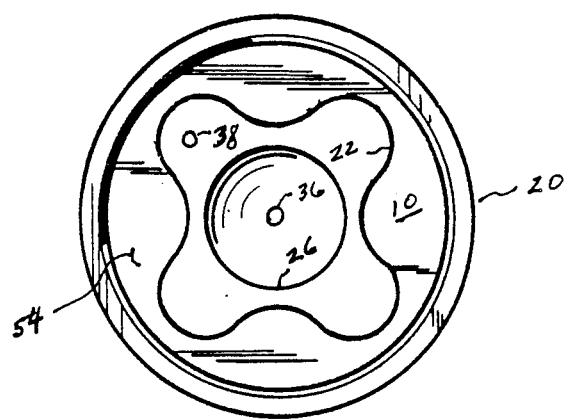
FIG. 2 is a top plan view of the component of FIG. 1.
Figure 1:
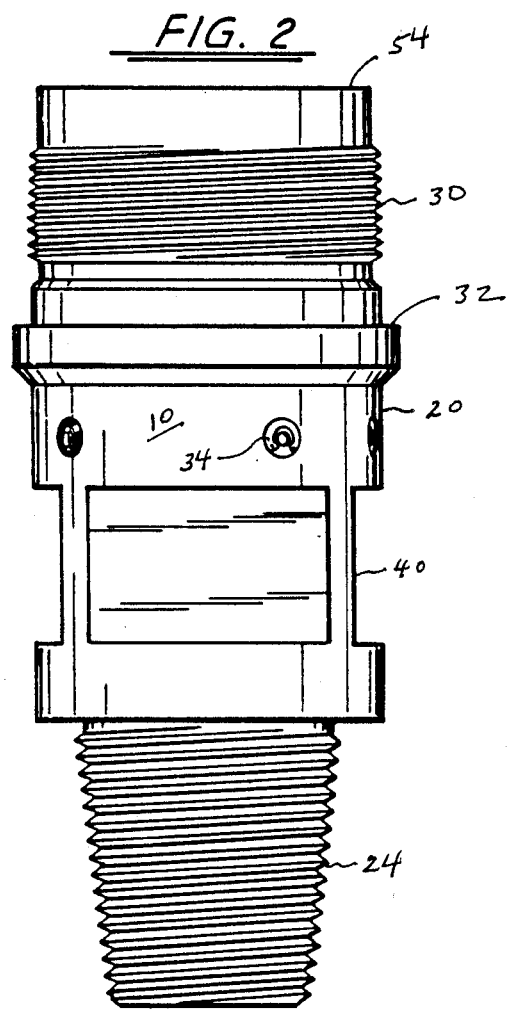
FIG. 1 is a front elevational view of the female drive rod component of the preferred embodiment of the apparatus of the present invention.
Figures 3, 4:
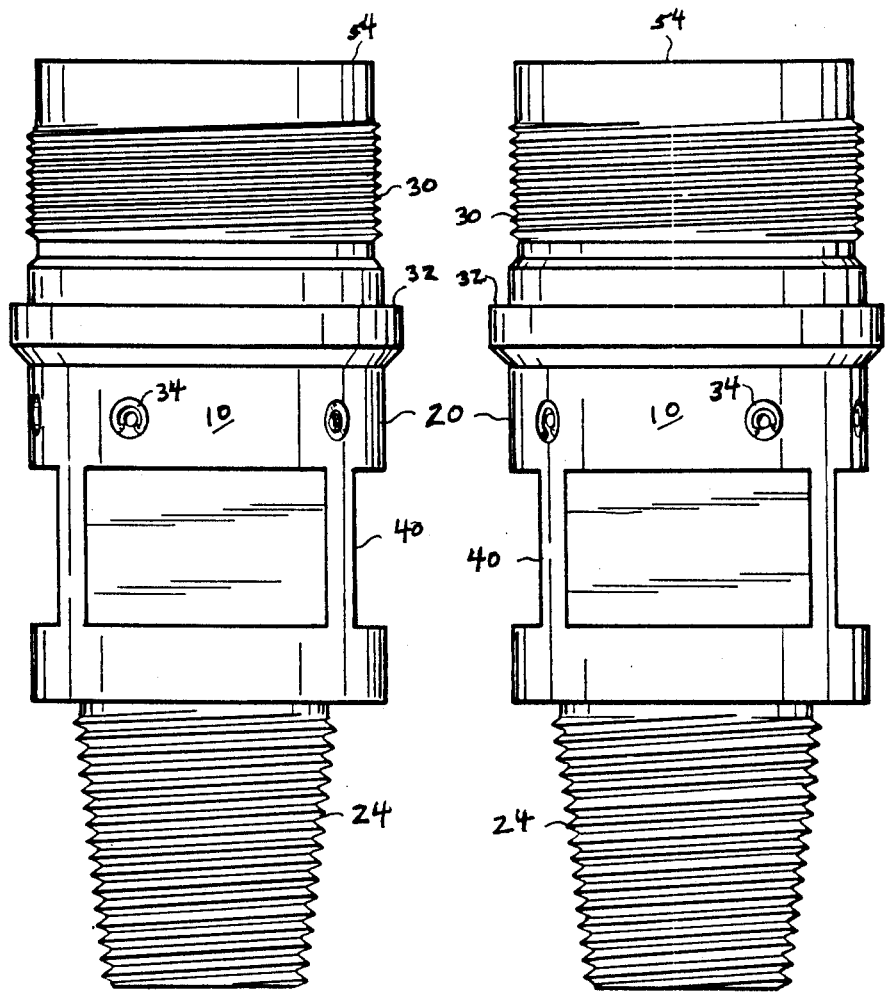
FIG. 3 is a left side elevational view of the component of FIG. 1.
FIG. 4 is a right side elevational view of the component of FIG. 1.
Figure 5:
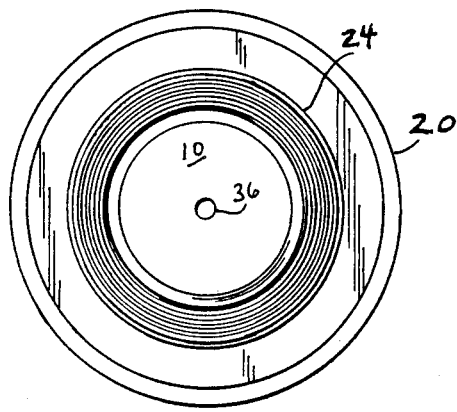
FIG. 5 is a bottom plan view of the component of FIG. 1.
Figure 9:
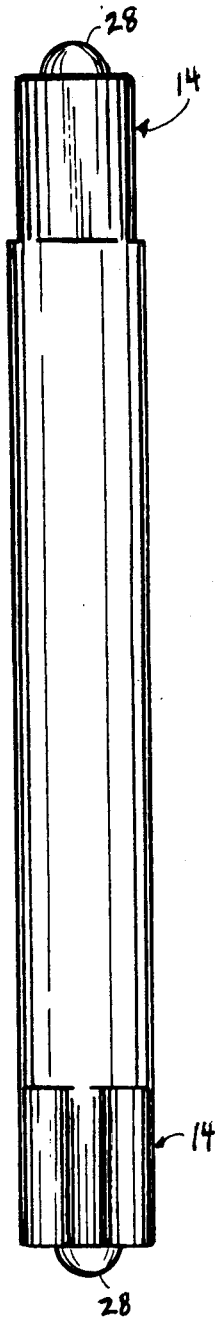
FIG. 9 is a front, side and rear elevational view of the male drive rod component of the preferred embodiment of the apparatus of the present invention.
Figure 10:
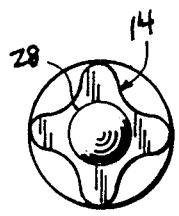
FIG. 10 is a top or bottom plan view of the component of FIG. 9.
Figure 11:
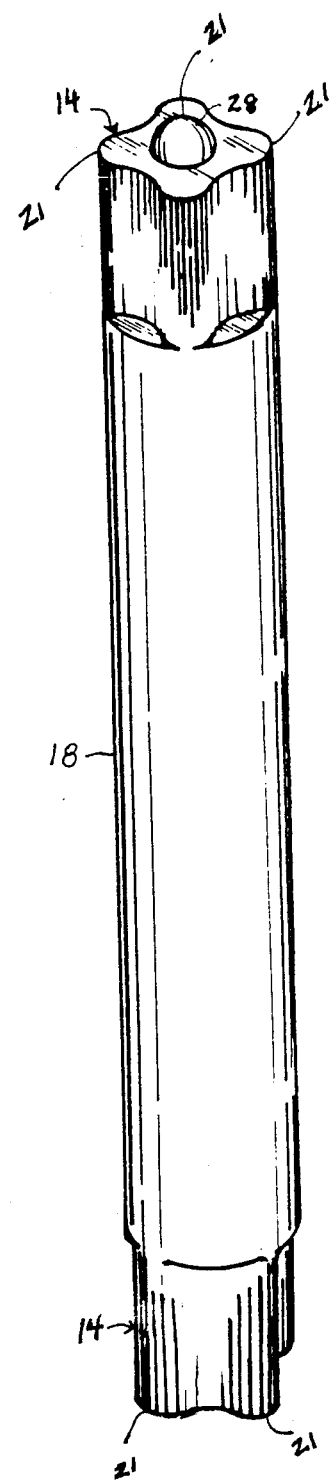
FIG. 11 is a top or bottom perspective view of the component of FIG. 9.
Figure 13:
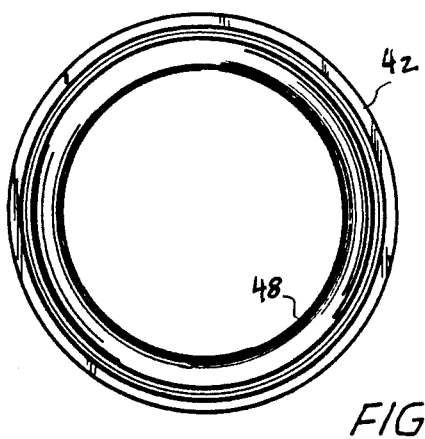
FIG. 13 is a top plan view of the component of FIG. 12.
Figure 15:
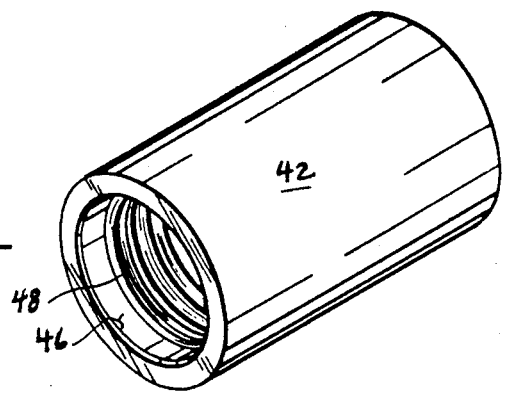
FIG. 15 is a top perspective view of the component of FIG. 12.
Figure 12:
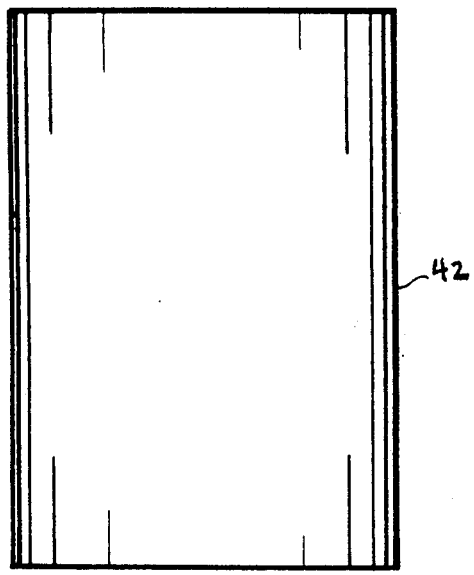
FIG. 12 is a front, rear and side elevational view of the drive rod collar component of the prefered embodiment of the apparatus of the present invention.
Figure 14:
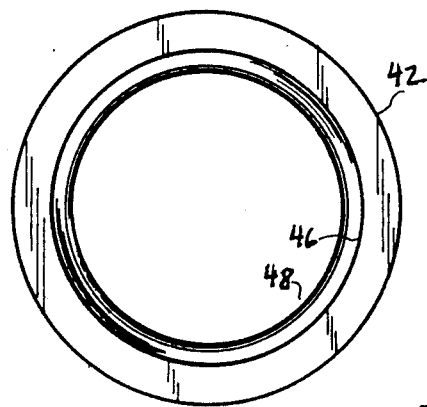
FIG. 14 is a bottom plan view of the component of FIG. 12.
Figure 16:
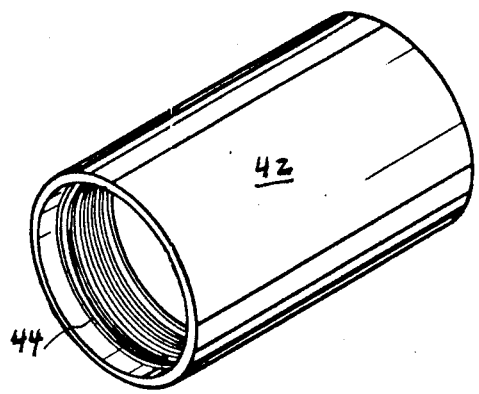
FIG. 16 is a bottom perspective view of the component of FIG. 12.

Referring now to the drawings, FIGS. 1-8 disclose female component 10 of articulated coupling 12 while FIGS. 9-11 disclose the corresponding male component 14 of articulated coupling 12. As will be discussed later, connecting rod assembly 16 comprises rigid connecting rod 18 with an articulated coupling 12 at each end.

Female component 10 comprises a generally cylindrically shaped member 20 having a lobed opening 22 at one end and a threaded connector 24 at the other. Lobed opening 22 includes a concave depression 26 in its center that is sized to accept convex projection 28 at the end of male component 14. Around the perimeter of lobed opening 22 are threads 30 adjacent ledge 32. On an opposite side of ledge 32 are a series of lubrication and pressure equalization ports 34 each extending radially through female component 10 that connect to center passageway 36 extending axially through female component 10. An off-set passageway 38 is also disclosed that connects to lobed opening 22. Machined surfaces 40 are positioned intermediate lubrication ports 34 and threaded connection 24 and they are machined orthogonal to each other to facilitate the assembly or disassembly of connecting rod assembly 16.

Referring now to FIGS. 9-11, male component 14 of connecting rod assembly 16 is illustrated. Male component 14 has four (4) lobes 21, as shown, in a convex projection 28 centered at its end. Both the lobes 21 and convex projection 28 are sized to roll within similarly lobed opening 20 and concave depression 26, respectively, of female component 10. A generally identical lobed male component 14 is also located at the other end of rigid connecting rod 18 with both such articulated couplings 12 being instrumental in forming connecting rod assembly 16. The rigidity of connecting rod 18 prevents it from bending or flexing during the transfer of the rotational and axial forces through it.

In FIGS. 12-16, there is shown protective collar 42 having a threaded interior 44 that couples with threads 30 of female component 10. The opposite end of collar 42 is configured having lip 46 that retains interior O-rings 48 in place.

Figure 17:
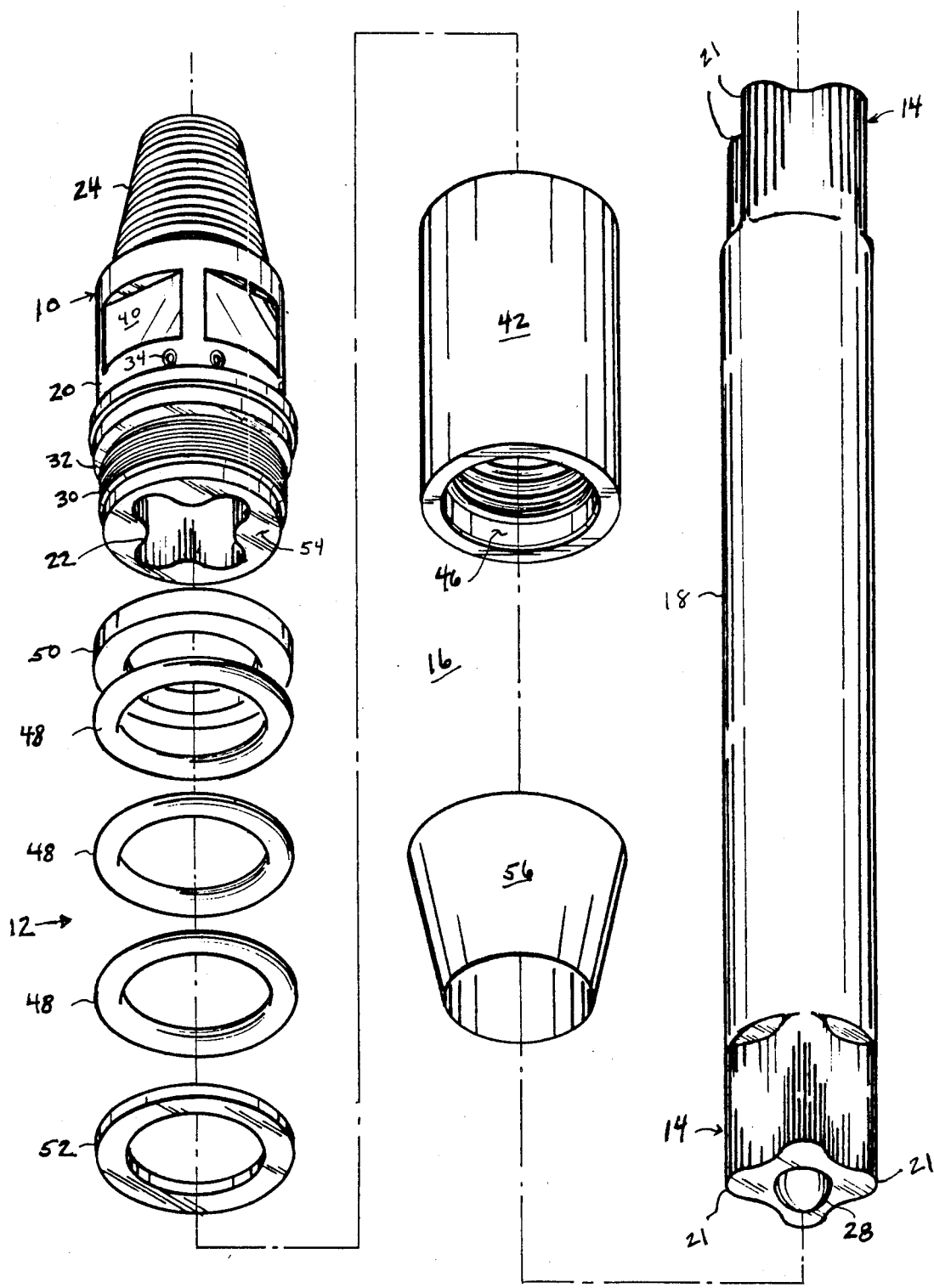
FIG. 17 is an exploded view of the assembled female, male and drive rod collar components of the preferred embodiment of the apparatus of the present invention.
Figure 18:
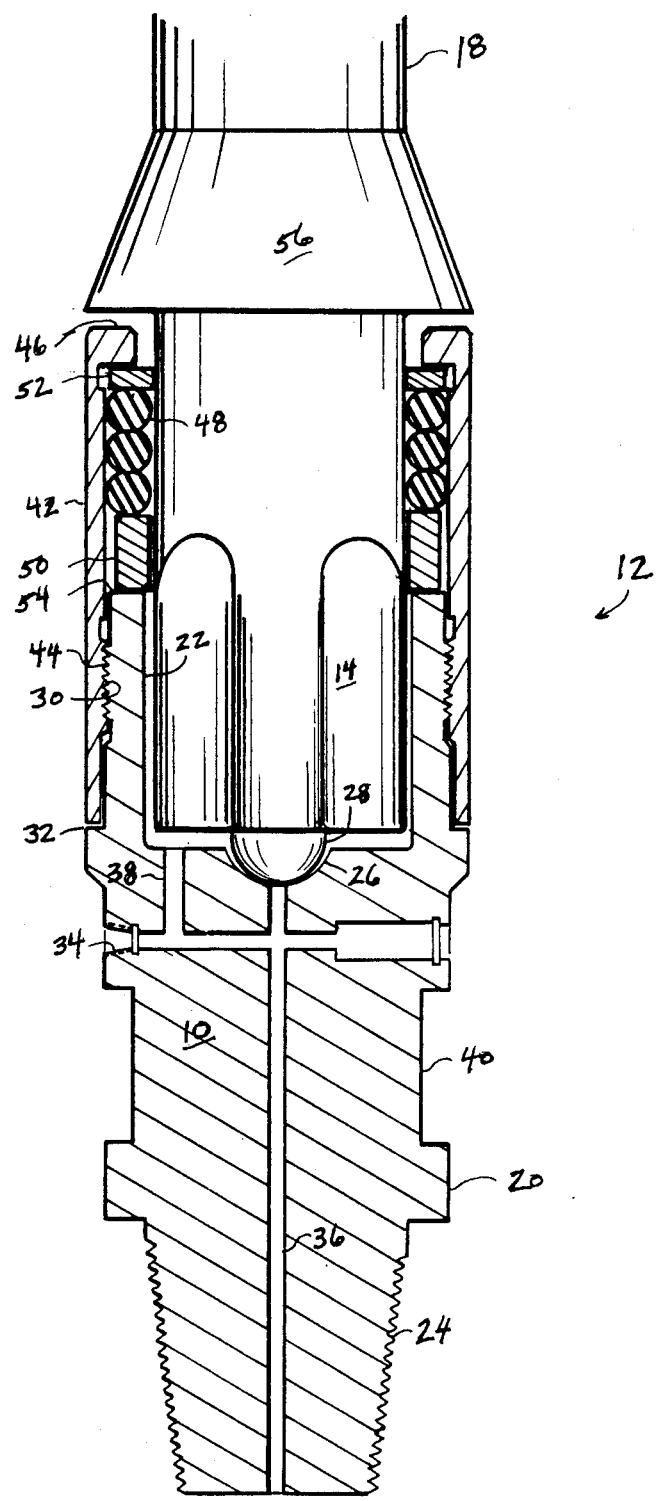
FIG. 18 is a cross-sectional view of the embodiment of FIG. 17 after it is "made-up".

Referring now to FIGS. 17 and 18, there is shown an exploded view of connecting rod assembly 16 (with only one (1) complete articulated coupling 12 illustrated for clarity). As shown, protective cone 56 would first be slipped around connecting rod 18 followed thereafter by protective collar 42 with threads 44 being exposed. Next, washer 52, O-rings 48, and spacer 50 are installed within protective collar 42 around male component 14 and positioned adjacent lip 46. Finally, threads 30 of female component 10 are coupled with threads 44 of protective collar 42 thereby compressing O-rings 48 between lip 46 and end 54 of female component 10 and between protective collar 42 and connecting rod 18. When thusly secured, protective cone 56 is positioned to protect this connection with its outermost surface generally flush with the outside circumference of protective collar 42. In some cases, protective cone 56 would not be movable, but instead would be an integral part of connecting rod 18 with collar 42 being secured flush with its base diameter.

Figure 19:
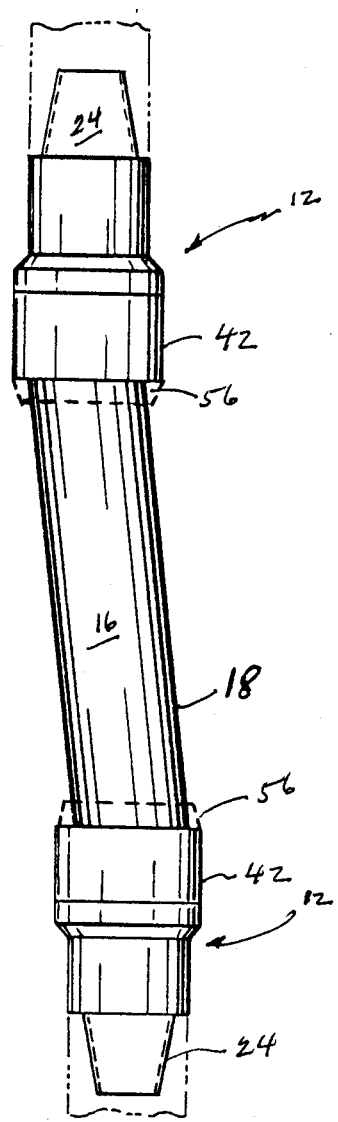
FIG. 19 is a side view of a "made-up" embodiment of FIG. 17 in an "off-set" position; and, FIG. 20 is a view similar to that of FIG. 19 but in a different "off-set" position.
Figure 20:
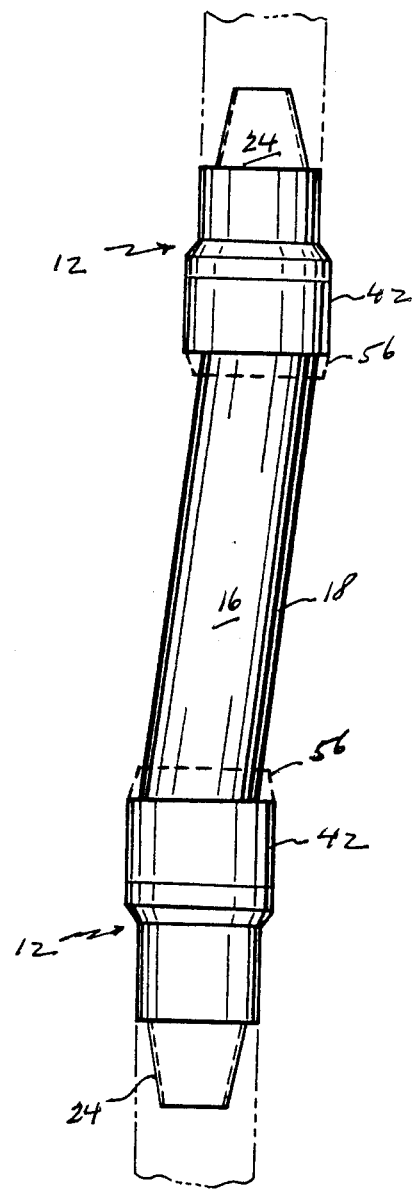

Referring now to FIGS. 19 and 20, connecting rod assembly 16 is disclosed in different articulated positions. The lobed male and female components 14 and 10 provide sufficient "play" between them such that threaded connectors 24 of each articulated coupling 12 can be attached to two (2) misaligned shafts and yet connecting rod assembly 16 is able to effectively transfer the rotational and axial forces from one shaft to the other. As described earlier, this feature is especially useful for connecting a rotating and gyrating downhole motor shaft to a bearing section that can only rotate.

As can be seen, the lobed male component 14 effectively transfers any rotational force directly to the sidewalls of lobed opening 22 of female component 10. Any axial thrust to be transmitted would pass directly through male component 14 via convex projection 28 and directly to concave depression 26 of female component 10. Any misalignment is absorbed by the pivoting of male component 14 within female component 10 which would also cause spacer 50, O-rings 48, and washer 42 to move along with male component 14. Convex projection 28 maintains a minimum distance or gap between male and female components 14 and 10 to permit the one to pivot with respect to the other.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A connecting rod assembly for transferring rotational and axial forces between axially misaligned members comprising:

(a) an elongated rigid connecting rod having a lobed male component at each end;

(b) a pair of generally cylindrical female components each having a similarly lobed opening therein, each of said openings being sized to loosely accept its respective said lobed male component, each of said female components also having means for connecting to one of said axially misaligned members;

(c) means for lubricating the connection between said male and said female components, said lubricating means comprising passageways extending radially through said female components;

(d) means for sealing the connection between said male and said female components, said sealing means comprising a plurality of O-rings positioned around said connecting rod adjacent said male component;

(e) means for protecting the connection between said male and said female components, said protecting means comprising a cylindrical collar secured around a portion of said female component, said collar securing said O-rings around said connecting rod;

(f) means for spacing said male component from said female component, thereby enabling said male and said female components to articulate or become jointed along separate longitudinal axis, said means for spacing comprising:

i. a convex projection secured to the end of each of said male components; and, ii. a concave depression in said lobed opening of each of said female components, said concave depression being sized to accept said convex projection.

2. The apparatus of claim 1, wherein said protecting means further comprises a protecting cone configured to flare outwardly away from said connecting rod sufficiently to become generally flush with said protective collar.

3. A connecting rod assembly connecting between two (2) axially misaligned members comprising:

(a) an elongated rigid generally cylindrical connecting rod;

(b) an articulated coupling secured to each end of said connecting rod, each of said articulated couplings comprising:

i. a male component forming a part of said connecting rod; and, ii. a female component secured to one of said axially misaligned members;

(c) said male component including spacing means for maintaining an annular gap between said male and said female components, thereby enabling said coupling to articulate while also permitting the transfer of axial force between said male and said female components, said means for spacing comprising:

i. a convex projection secured to the end of each of said male components; and, ii. a concave depression in said opening of each of said female components, said concave depressions being sized to accept said convex projections;

(d) said female component including an opening therein sized to loosely accept said male component while enabling the transfer of rotational force between said male and said female components;

(e) means for lubricating the connection between said male and said female components, said lubricating means comprising passageways extending radially through said female components;

(f) means for sealing the connection between said male and said female components, said sealing means comprising a plurality of O-rings positioned around said connecting rod adjacent said male component; and, (g) means for protecting the connection between said male and said female components, said protecting means comprises a cylindrical collar secured around a portion of said female component, said collar securing said O-rings around said connecting rod.

4. The apparatus of claim 3, wherein said male and said female components are lobed.

5. The apparatus of claim 3, wherein said protecting means further comprises a protecting cone configured to flare outwardly away from said connecting rod sufficiently to become generally flush with said protective collar.

* * * * *